R. ULBRECHT.
APPARATUS FOR REMOVING EXCREMENTA, &c., FROM DAIRY BARNS.
APPLICATION FILED APR. 27, 1918.
1,274,219.
Patented July 30, 1918.
3 SHEETS—SHEET 2.
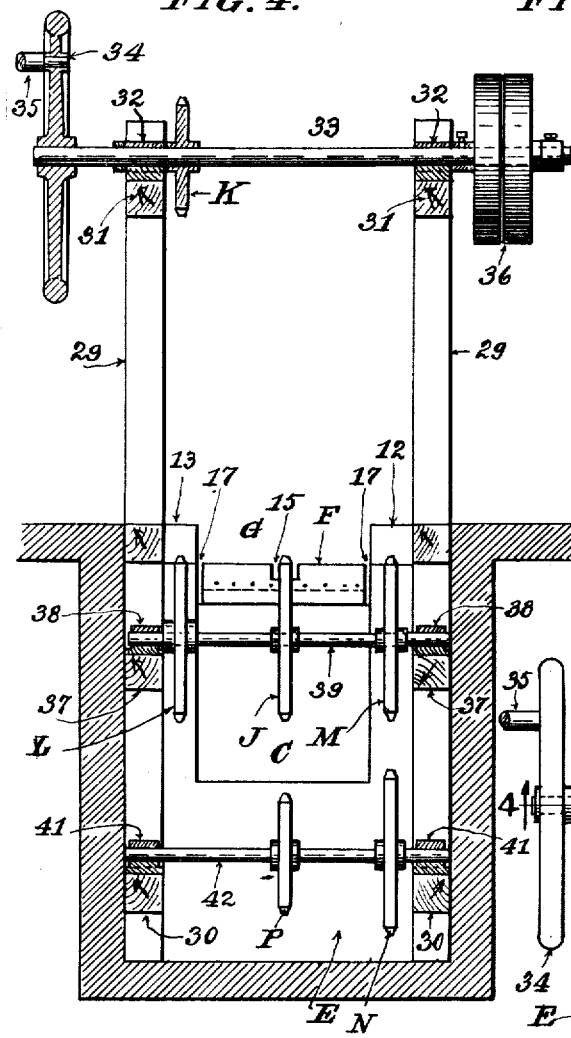
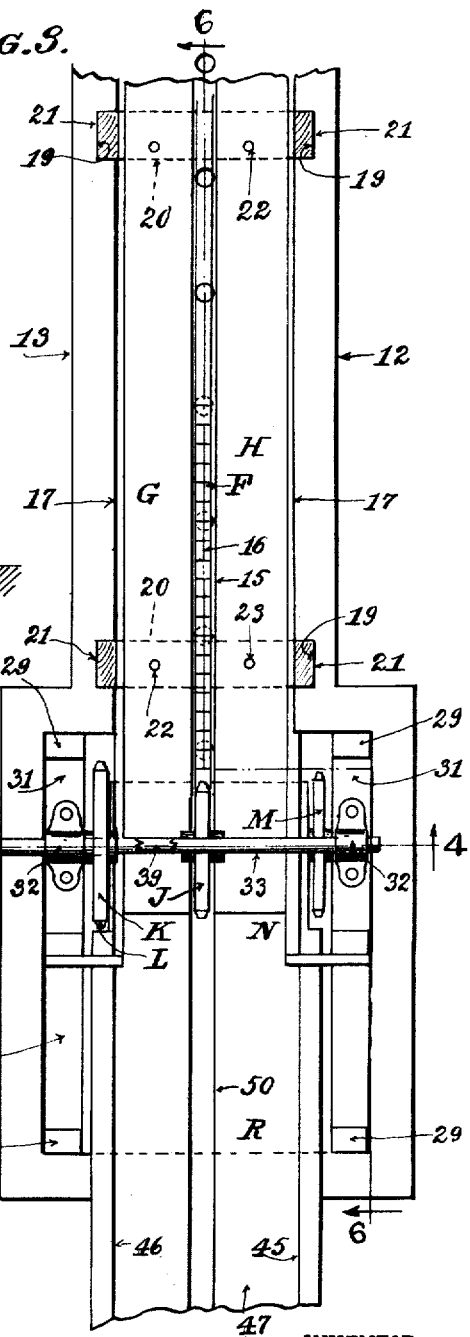
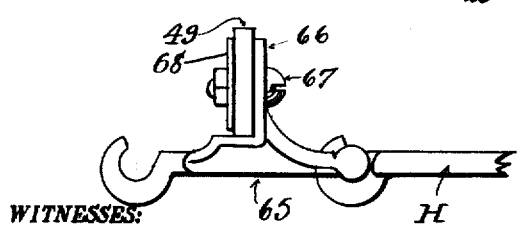
WITNESSES:
INVENTOR:
ROBERT ULBRECHT,
BY
ATTORNEYS.

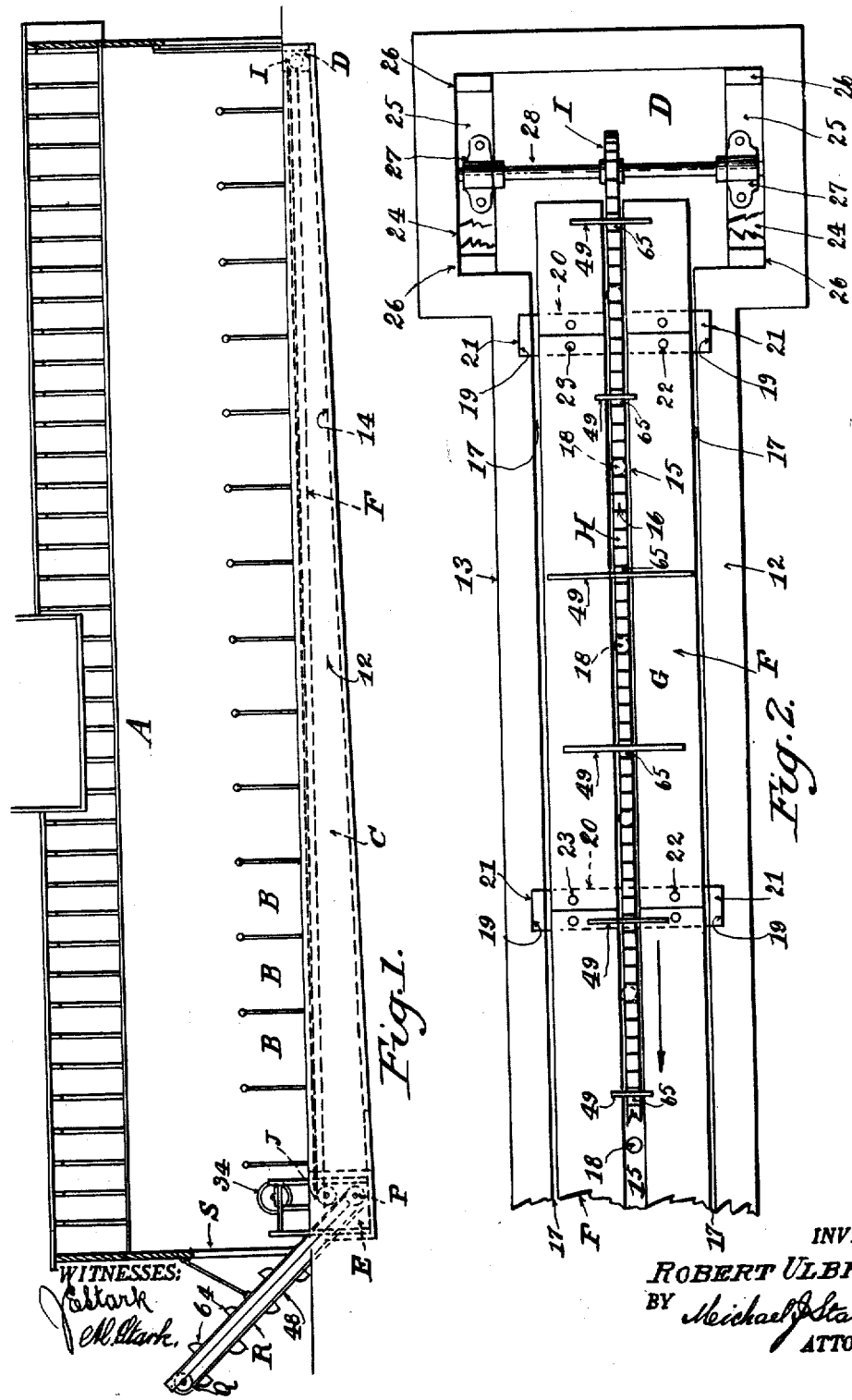

R. ULBRECHT.
APPARATUS FOR REMOVING EXCREMENTA, &c., FROM DAIRY BARNS.
APPLICATION FILED APR. 27, 1918.
1,274,219.
Patented July 30, 1918.
3 SHEETS—SHEET 3.
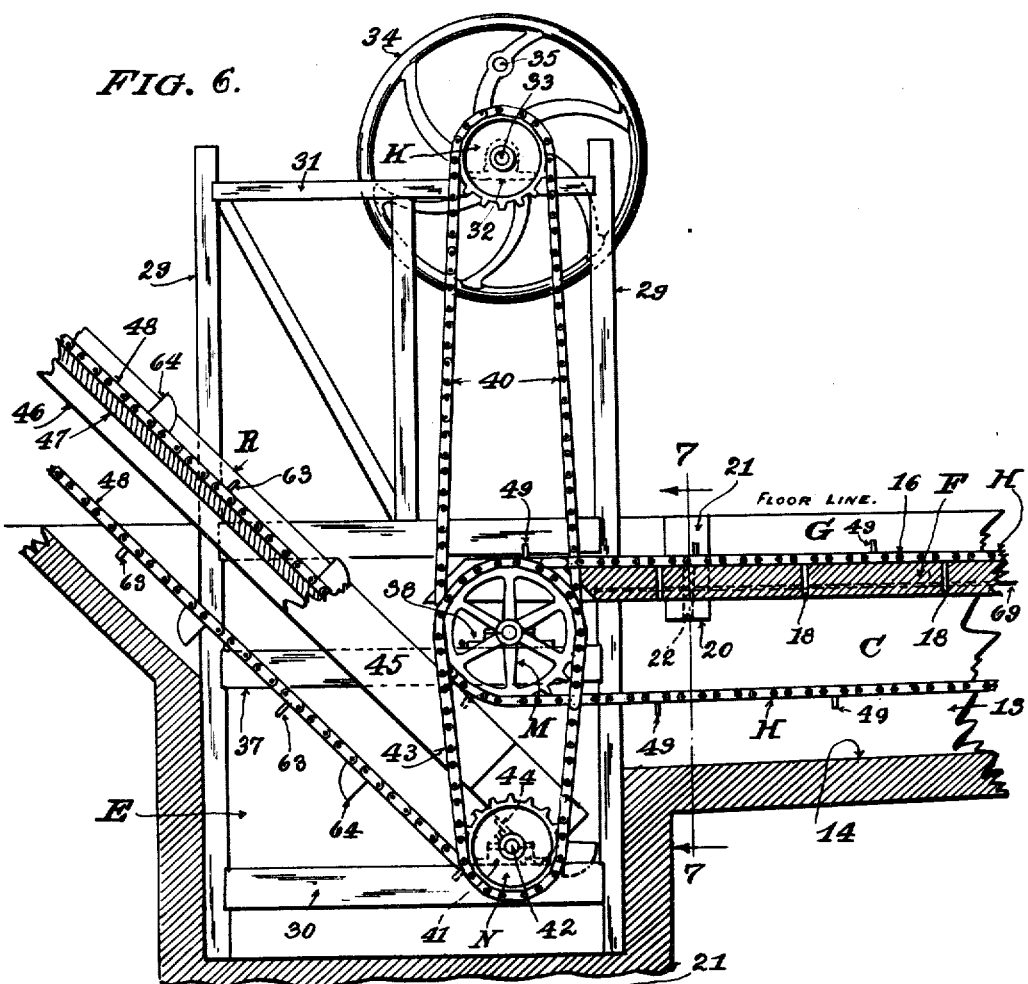
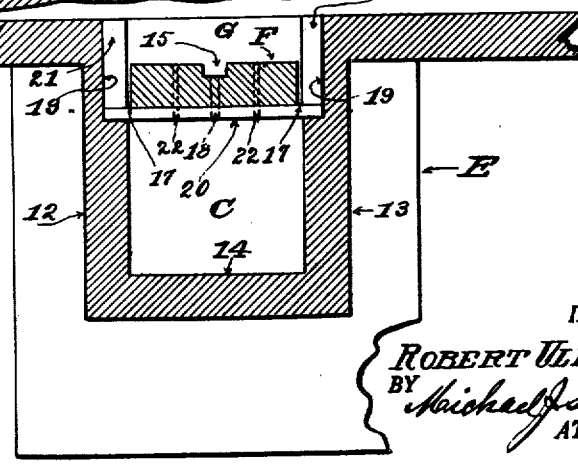
INVENTOR:
ROBERT ULBRECHT,
BY Michael J. Stark & Sons
ATTORNEYS.
WITNESSES:

UNITED STATES PATENT OFFICE.

ROBERT ULBRECHT, OF CHICAGO, ILLINOIS.

APPARATUS FOR REMOVING EXCREMENTA, &c., FROM DAIRY-BARNS.

1,274,219. Specification of Letters Patent. Patented July 30, 1918.

Application filed April 27, 1918. Serial No. 231,193.

*To all whom it may concern:*

Be it known that I, ROBERT ULBRECHT, a citizen of the United States, and a resident of the city of Chicago, in the county of Cook and State of Illinois, have invented a certain new and useful Improvement in Apparatus for Removing Excrementa, &c., from Dairy-Barns; and I do hereby declare that the following description of my said invention, taken in connection with the accompanying sheet of drawings, forms a full, clear, and exact specification, which will enable others skilled in the art to which it appertains to make and use the same.

My invention relates generally to improvements in apparatus for removing excrementa, &c., from dairy barns; and it consists, essentially, in the novel and peculiar combination of parts and details of construction, as hereinafter first fully set forth and described and then pointed out in the claims.

It is the object of my present invention to provide, in a dairy barn or similar structure, wherein animals are housed, efficient means whereby the droppings of these animals are removed without any considerable manual labor. A further object of my invention is the installation of suitable means whereby this removal of the feces and excrementa is mechanically performed. A still further object of this invention is the construction of mechanism by which I accomplish the desired result, in such manner that repairs, and renewals of parts, when necessary, can be readily and expeditiously accomplished. Other objects of this invention will hereafter more fully appear.

In the drawings forming a part of this specification, which illustrate the preferred embodiment of my invention, Figure 1 is a miniature view of a barn in which my invention is installed. Fig. 2 is a plan of one end of the apparatus, drawn on an increased scale; and Fig. 3 is a similar view of the other end of said apparatus. Fig. 4 is a sectional elevation of the operating mechanism, drawn on line 4—4 of Fig. 3. Fig. 5 is a detail side view of a fragment of the endless conveyer band employed in this device. Fig. 6 is a longitudinal sectional elevation on the indirect line 6—6 of Fig. 3; and Fig. 7 is a transverse sectional elevation on line 7—7 of Fig. 6.

Like parts are designated by the same symbols and characters of reference in all the various figures.

In dairy stables it is imperative that the most scrupulous cleanliness be observed to keep the cows in the best of health, and to prevent the contamination of the milk; and in order to accomplish this result, the sanitary conditions require the immediate removal from the barn of the feces and excrementa of the cows and other animals that may be housed in the barn. In dairy barns where a considerable number of animals are stabled, this removal of the dung is a laborious matter and requires the constant attention of one or more employees. To facilitate the prompt removal of this objectionable matter, I install in a dairy barn mechanism which may be operated by hand or power, preferably by the latter, whereby the desired object may be readily and effectively accomplished.

A modern dairy barn in which the milch cows are housed, is almost universally provided with a cement or concrete floor. A passage way generally runs longitudinally through the barn, and the cows are kept in stalls or stanchions with their backs toward this passage. As now in general practice, the feces of the animals are dropped on the floor of this passage, and an attendant collects the same by shoveling and removes the droppings from the barn. Attempts have been made to collect these droppings, and remove them from the barn by mechanical means.

I shall now proceed to describe my invention in detail.

In Fig. 1, the reference letter A, designates a dairy barn of any approved construction, and of any desired capacity. In this barn there are series of stalls or stanchions B; and in front of these stalls I install a conveyer, and an elevator, in the following manner:

A trench C, approximately the full length of the barn is provided which trench has parallel spaced, vertical walls 12, 13, and a bottom or floor 14, all, preferably formed of concrete which material has been found to be very satisfactory and eminently sanitary. At one end of this trench C there is formed an enlargement or pit D, and at the other end there is formed a cesspool or catch basin E. In this trench, and a suitable distance below the floor line there is placed a false bottom F, which bottom affords, in conjunction with the sides of the trench, a shallow gutter G, into which the feces and excrementa of the animals are dropped. This false bottom F has centrally its entire length a groove or depression 15, and in this groove there is located the upper stretch 16, of a metallic, endless conveyer band H, to be hereinafter more specifically referred to.

The false bottom F consists, preferably, of concrete slabs of proper length, width, and thickness, the width being slightly less than the width of the gutter G, so as to enable these slabs being properly placed, and at the same time afford narrow passages 17, between the slabs and the walls of the trench for urine, water, and other liquid matter to reach the bottom on the trench, there being in the groove 15, at suitable intervals, vertically disposed through-openings 18, for a like purpose.

In order to properly support the slabs F in the trench, I form in the walls 12, 13, at opposite points, and at suitable intervals, recesses 19, reaching from the upper margins of the side walls 12, 13, downwardly a proper distance below the slabs F, and locate therein bars 20, on which the slabs F are carried. I then force into the recesses 19, onto the bars 20, blocks 21, which fit the recesses by a close driving fit, and thereby securely hold the bars 20 in position without any other means of fastening. In the slabs F, and adjacent the abutting ends thereof, and in the corresponding positions in the bars 20 there are vertical openings 22, into which dowel pins 23 are driven to securely hold the slabs in position, but to permit of their removal, should this become desirable or necessary. I make these bars 20, and dowel pins and blocks, preferably, of wood for the reason of cheapness and convenience, but they may be also made of any other material or metal, if desired.

In the pit D there is located a frame structure, comprising two lower sills 24, two upper sills or bars 25, and four corner posts 26, all properly framed together; and upon the upper sills there are mounted bearings 27, in which is rotatably journaled a shaft 28, on which there is secured a sprocket wheel I. This frame structure fits the pit by a close fit, but is not fastened therein by any specific means, its close fit and its weight being ample to keep the frame structure in position.

In the catch basin E there is located a frame structure, comprising four corner posts or uprights 29, which reach from the bottom of the cesspool upwardly a suitable distance above the floor of the barn. Pairs of these uprights are connected at their lower ends by sills 30, best shown in Figs 4 and 6; and at their upper ends by rails 31, and upon these latter rails there are located bearings 32, in which there is mounted a shaft 33, carrying at one end means for rotating said shaft, which means may be a fly wheel 34, provided with a crank handle 35, tight and loose pulleys 36, or any other mechanism for accomplishing the object in view.

A suitable distance below the floor line of the barn, the pairs of uprights or corner posts 29 are again connected by rails 37; and upon these rails 37 are located bearings 38, in which there is rotatably mounted a shaft 39; and medially on this shaft there is secured a sprocket wheel J, over which, and the sprocket wheel I in the pit D, the endless conveyer belt H is trained. At one side of the upper shaft 33 and at the corresponding position of the medial shaft 39, there are mounted a driving sprocket wheel K, and a driven sprocket wheel L, respectively, over which a link belt 40, is trained to communicate rotative motion from shaft 33 to shaft 39, and thereby to operate the conveyer belt H.

Upon the lower sills 30 in the catch basin there are mounted bearings 41, in which is rotatably mounted a shaft 42. Near the end of shaft 39 carrying the sprocket wheels L, J, there is mounted a third sprocket wheel M; and in a corresponding position on the lower shaft 42, there is affixed a driven sprocket wheel N, which is rotated from the sprocket wheel M by a link belt 43.

Upon the lower shaft 42 there is pivoted, by bearings 44, engaging said shaft 42, an elevator R, consisting of two stringers 45, 46, connected by a bottom 47. Medially of the lower shaft 42, there is affixed a sprocket wheel P, Fig. 4, and at the upper end of the elevator there is rotatably mounted a sprocket wheel Q, Fig. 1, an endless link belt 48, being trained over sprockets P, Q, to serve as an elevator belt. This elevator stands approximately at an angle of 45 degrees and passes, preferably, through an opening in the end wall S, to the outside of the barn, and it extends, preferably, high enough to permit a farm wagon, not shown, being placed under the same to serve as a receiver for the matter removed from the barn.

To the endless conveyer belt H, there are secured at proper intervals slats 49, which slats are low bars, preferably of wood, and serve as scrapers to convey the matter dropped into the gutter to the catch basin. These slats are of various lengths, a series of successively increasing lengths being repeated as often as necessary to produce the desired effect. Thus the shortest bars or slats will move only matter in the center of the gutter; the next longer ones still more, and so on, the longest ones reaching from wall to wall of the gutter and sweeping the matter adjacent these walls. The object of making these slats of various lengths is to divide the matter to be removed over a number of the slats.

These slats are very low compared with the depth of the gutter, the object being to cause them to dig into a pile of matter that may be located in the gutter, as for instance, when bedding in the stalls is to be removed and renewed, and to take but a portion of this matter at a time, whereby the operation of the apparatus is greatly facilitated and the straining of the conveyer belt avoided.

Medially in the bottom of the elevator bottom 47, there is a longitudinal groove 50, Fig. 3, similar to the groove 15 in the slats F, in which the upper stretch of the endless elevator chain 48 moves. Upon this latter endless belt there are placed at suitable intervals scrapers 63, the full width of the elevator, and intermediate of these scrapers 63 there are elevator buckets 64, which are, however, considerably shorter than the scrapers 63, the object of the buckets being to remove liquid and semi-liquid matter from the catch basin that enters the same from the trench C.

In Fig. 5 I illustrate a pair of links forming the elevator, and the conveyer endless belts. Thus in each belt there are a number of attachment-links 65, having an integrally formed cross bar 66, to which the slats 49 are attached by suitable bolts 67; a sheet metallic or band-iron strap 68, being used in front of the slat to strengthen the same and to protect it against rapid wear.

From what has been heretofore stated, the operation of this device is perfectly obvious. Briefly stating the same, the droppings falling into the gutter are conveyed by the scrapers to the catch basin, and falling upon the elevator bottom, are carried upwardly and over the top of the elevator and dropped into a suitable receptacle for removal. At the same time the buckets in the elevator will dip the liquid matter from the bottom of the catch basin and deliver the same wherever directed.

The entire work below the floor line of the barn, i. e. the walls, the bottoms, and the false bottom are readily produced in concrete, and wherever required will be suitably reinforced by metallic rods. This is specially the case with the slabs F in which reinforcing rods 69, Fig. 6, are embedded in the concrete while being poured in a suitable mold.

Attention is invited to the fact that there is no metal used in the construction of the frames which carry the machinery necessary for the proper operation of this apparatus; and that these parts are readily removed, replaced, or repaired, should such be required, without disturbing the concrete work in the least, a feature which will recommend itself to all who understand the difficulty of repairing metal parts that are exposed to fumes, acidulous liquids and other deleterious influences.

The operation of this apparatus may be continuously carried on during the day and night, by being connected to any suitable motor or prime mover; or it may be interruptedly operated, or at predetermined intervals, a matter which will be readily determined by local requirements, the number of animals stabled, and other conditions prevailing at certain localities.

Attention is furthermore directed to the grooves in the floor of the gutter and in the bottom of the elevator, in which groove the upper runs of the endless bands are constructed to move. This is an important feature of my invention for the reason that thereby these endless bands are perfectly guided and prevented from lateral swaying or swinging, and that the scrapers thereon are properly sustained in their transverse position while moving over these bottoms.

I have heretofore stated that the work below the floor line in the barn will be made in concrete; but it does not follow that this is imperative, since wood or metal may be employed for the object indicated without departing from my invention.

I have hereinbefore described with considerable minuteness the preferred embodiment of my invention, but I desire it to be understood that I am aware that minor details of construction may be varied, and parts omitted without departing from the scope of my invention as defined in the appended claims.

Having thus fully described my invention, I claim as new, and desire to secure to myself by Letters Patent of the United States—

1. In a structure of the nature described, a trench, a pit at one end of said trench, a catch basin at the other end of said trench, a removable floor or false bottom in said trench to afford a comparatively shallow gutter, mechanism mounted in said pit and in said catch basin, an endless conveyer band in said gutter, scrapers on said conveyer band constructed to sweep over the upper surface of said false bottom, said mechanism in said pit and said catch basin being constructed to operate said endless conveyer band, the bottom of said trench inclining toward said catch basin.

2. In a structure of the nature described, a trench, a pit at one end of said trench, a catch basin at the other end of said trench, a removable floor or false bottom in said trench to afford a comparatively shallow gutter, said gutter having a longitudinal groove in its upper surface medially of its width, mechanism mounted in said pit and in said catch basin, an endless conveyer band in said gutter, scrapers on said conveyer band constructed to sweep over the upper surface of said false bottom, said mechanism in said pit and in said catch basin being constructed to operate said endless conveyer band, said trench having a true bottom inclined toward said catch basin.

3. In a structure of the nature described, a trench, a pit at one end of said trench, a catch basin at the other end of said trench, a removable floor in said trench to afford a comparatively shallow gutter, said gutter having a longitudinal groove in its upper surface medially of its width, mechanism mounted in said pit and said catch-basin, an endless conveyer band in said gutter, the upper stretch of said endless conveyer band being movable in said groove and prevented from lateral swinging therein, scrapers on said conveyer band constructed to sweep over the upper surface of said floor, said mechanism in said pit and said catch basin being constructed to operate said endless conveyer band, said trench having a true bottom spaced from the removable floor and inclined toward the catch basin.

4. In a structure of the nature described, a trench, a pit at one end of said trench, a catch basin at the other end of said trench, a removable floor in said trench to afford a shallow gutter therein, mechanism mounted in said pit and said catch basin, an endless conveyer band in said gutter, scrapers on said conveyer band constructed to sweep over the upper surface of said removable floor, said mechanism in said pit and in said catch basin being constructed to operate said endless conveyer band, a true bottom in said trench, said true bottom inclining toward said catch basin, an elevator, the lower end of said elevator extending upwardly and angularly from said catch basin, an endless elevator belt mounted on said elevator, a series of scrapers on said endless elevator belt, a series of buckets on said elevator belt, and means connected to the operating means of the endless conveyer band for operating the endless elevator belt simultaneously with the conveyer band.

5. In a structure of the nature described, a trench, a pit at one end of said trench, a catch basin at the other end of said trench, a removable floor or false bottom in said trench to afford a comparatively shallow gutter, said gutter having a longitudinal groove in its upper surface medially of its width, mechanism mounted in said pit and in said catch basin, an endless conveyer band in said gutter, scrapers on said conveyer band constructed to sweep over the upper surface of said false bottom, said mechanism in said pit and in said catch basin being constructed to operate said endless conveyer band, said trench having a true bottom spaced from said false bottom and inclined toward said catch basin, an elevator mounted in said catch basin and extending upwardly and angularly therefrom, an endless belt mounted on said elevator, a series of scrapers on said endless belt, a series of elevator buckets on said endless belt intermediate said scrapers, and means for operating the endless belt on the elevator from, and simultaneously with, the mechanism that operates the endless conveyer band in said gutter.

6. In a structure of the nature described, a trench, a pit at one end of said trench, a catch basin at the other end of said trench, a floor in said trench, said floor comprising separate slabs, said separate slabs being supported in said trench below the upper margins thereof to afford a shallow gutter, said slabs having longitudinal grooves in their upper surface medially of their width, mechanism mounted in said pit and in said catch basin, an endless conveyer band in said gutter, the upper stretch of said endless conveyer band being movable in said groove and prevented from lateral swinging therein, scrapers on said conveyer band constructed to sweep over the upper surface of said floor, said mechanism in said pit and in said catch basin being constructed to operate said endless conveyer band, an elevator mounted in said catch basin and extending upwardly and angularly therefrom, an endless belt mounted on said elevator, a series of scrapers on said endless belt, a series of buckets on said endless belt intermediate of said scrapers, the lower end of said elevator extending below the discharge end of said endless conveyer band and beyond the same, the mechanism for operating the endless belt on the elevator being connected to, and operating simultaneously with, the mechanism which operates said conveying band.

7. In a structure of a nature described, a trench, said trench having vertical parallel spaced walls, an inclined bottom in said trench, and a removable false bottom near the upper margins of said walls, said false bottom being comprised of concrete slabs, said slabs being narrower than the space between said vertical walls, bars under said slabs and means for removably securing said slabs to said bars.

8. In a structure of the nature described, a trench, a false floor in said trench, an endless conveyer band movable on said floor, there being on said endless conveyer band a series of a multiplicity of scrapers, said scrapers being attached to said band and of successively longer length.

9. In a structure of the nature described, a trench, said trench having parallel spaced vertical walls, an inclined bottom in said trench, a false bottom in said trench below the upper margins of said walls to afford a shallow gutter therein, said false bottom being comprised of slabs, said slabs being narrower than the width of said trench to afford narrow passages between the walls and the margins of said slabs, said slabs being supported in said trench upon bars transversely of said trench and removably secured to said bars.

10. In a structure of the nature described, a trench, said trench having parallel spaced vertical walls, an inclined bottom in said trench, said walls and said bottom being formed of concrete, a false bottom in said trench below the upper margins of said walls to afford a shallow gutter in said trench, said false bottom being comprised of concrete slabs, said slabs being narrower than the width of said trench to afford narrow passages between said walls and the longitudinal margins of said slabs, there being in the upper part of said walls and opposed to each other vertical recesses, bars in said recesses upon which said slabs are carried, and blocks in said recesses bearing upon said bars.

In testimony that I claim the foregoing as my invention I have hereunto set my hand.

ROBERT ULBRECHT.